United States Patent
Hara et al.

(10) Patent No.: US 7,525,911 B2
(45) Date of Patent: Apr. 28, 2009

(54) CONGESTION CONTROLLER FOR ETHERNET SWITCH

(75) Inventors: Toshihide Hara, Kawasaki (JP); Takahide Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 677 days.

(21) Appl. No.: 10/650,447

(22) Filed: Aug. 28, 2003

(65) Prior Publication Data
US 2004/0081090 A1 Apr. 29, 2004

(30) Foreign Application Priority Data
Sep. 9, 2002 (JP) .............................. 2002-263102

(51) Int. Cl.
*G01R 31/08* (2006.01)
*G06F 15/16* (2006.01)
(52) U.S. Cl. ................... 370/230.1; 370/235; 370/237; 709/233; 709/235
(58) Field of Classification Search .............. 370/230.1, 370/237, 360, 396, 395.21, 395.3, 395.4, 370/395.42, 230, 235, 401, 412
See application file for complete search history.

(56) References Cited

U.S. PATENT DOCUMENTS

| | | | | |
|---|---|---|---|---|
| 5,768,258 | A * | 6/1998 | Van As et al. ................ | 370/236 |
| 6,628,613 | B1 * | 9/2003 | Joung et al. .................. | 370/230 |
| 6,721,273 | B1 * | 4/2004 | Lyon ........................... | 370/235 |
| 6,741,559 | B1 * | 5/2004 | Smeulders et al. .......... | 370/230 |
| 6,957,269 | B2 * | 10/2005 | Williams et al. ............. | 709/235 |
| 7,035,255 | B2 * | 4/2006 | Tzeng ......................... | 370/389 |
| 7,050,430 | B2 * | 5/2006 | Kalkunte et al. ............. | 370/389 |
| 7,061,864 | B2 * | 6/2006 | van Everdingen ........... | 370/233 |
| 7,227,841 | B2 * | 6/2007 | Mullendore et al. ......... | 370/230 |
| 2002/0136163 | A1 | 9/2002 | Kawakami et al. .......... | 370/229 |
| 2002/0172205 | A1 * | 11/2002 | Tagore-Brage et al. .. | 370/395.42 |
| 2003/0016628 | A1 * | 1/2003 | Kadambi et al. ............ | 370/235 |
| 2003/0185249 | A1 * | 10/2003 | Davies et al. ............... | 370/535 |

FOREIGN PATENT DOCUMENTS

| | | |
|---|---|---|
| JP | 8-511142 | 11/1996 |
| JP | 09-289513 | 11/1997 |
| JP | 2002-223223 | 8/2002 |

OTHER PUBLICATIONS

Japanese Office Action mailed Sep. 5, 2006.
Detailed TCP/IP Protocol 9th Ethernet (No. 4) Flow Control VLAN, Troubleshooting 1. Flow Control of Ehternet>[Online] Oct. 2, 2001, Network Technology Lecture http://www.atmarkit.co.jp/fwin2k/network/tcpip009/tcpip01.html.

\* cited by examiner

*Primary Examiner*—Wing F Chan
*Assistant Examiner*—Hicham B Foud
(74) *Attorney, Agent, or Firm*—Kattern Muchin Rosenman LLP

(57) ABSTRACT

The present invention relates to a congestion controller, which suppress transmission traffic based on a traffic attribute in the event of congestion especially in a circumstance in which a plurality of Ethernet switches are connected. The congestion controller in the Ethernet switch comprises a plurality of transmission queues having different priority each other, a receiving unit for receiving a PAUSE frame, and a restriction unit to restrict transmission traffic from the transmission queue by the received PAUSE frame, wherein the restriction unit restricts the transmission traffic from a transmission queue of lowest priority by a PAUSE frame received at a time other than a PAUSE time and suppresses transmission traffic from a transmission queue of highest priority by a PAUSE frame received during the PAUSE time.

5 Claims, 10 Drawing Sheets

Type: 0x8808
DA: 01:80:C2:00:00:01 (multicast)
OPc: 0x0001
Parameter: 0~65535

SYSTEM I ; GAP IS CALCULATED BASED ON A FRAME LENGTH

SYSTEM II ; GAP GENERATION IN Δt TIME

CONGESTION CONTROLLER FOR ETHERNET SWITCH

BACKGROUND OF THE INVENTION

1. Field of the Invention

The present invention relates to a congestion controller, and in particular, it relates to a congestion control system to control transmission traffic using a PAUSE frame when congestion occurs in an environment in which a plurality of Ethernet switches are connected.

2. Description of the Related Art

Conventionally, if congestion occurs in an Ethernet (Registered Trademark) network, a PAUSE frame defined by IEEE 802.3 is sent from a switch such as a switching hub, in which the congestion occurs, to inner switches, to thereby control input traffic (See Note 1).

FIG. 1 shows an example of congestion control using a PAUSE frame, and FIG. 2 shows a PAUSE frame format.

In FIG. 1, if congestion occurs in a link "α" on the transmission port side of a switch 1 (SW1), the congestion is detected by a threshold value of a buffer (queue) in the switch 1. Thereafter, in order to restrict the transmission traffic from inner switches 2-5 (SW2-SW5), the switch 1 sends a PAUSE frame to the switches 2-5. As shown in FIG. 2, the PAUSE frame sets, as the destination address (DA: Destination Address), a multicast address representing the PAUSE frame.

In a parameter field of the PAUSE frame, a timer value of Pause time, e.g., XX (ms) is set. If the timer value is 0, it represents that the PAUSE state is released and the transmission state is established. Other fields are the same as those of a typical Ethernet frame and are not discussed herein.

The inner switches 2-5 suppress traffic transmission to the outer switch 1 with which the congestion has occurred, for a predetermined time, based on the timer value included in the received PAUSE frame. If the node which receives the PAUSE frame is a terminal, transmission is suppressed temporarily based on the timer value, as long as the terminal has a NIC (Network Interface Card) which supports the PAUSE frame. When the PAUSE time is up, the transmission which has been suspended is resumed.

Note 1: Okabe Yasuichi <Detailed TCP/IP Protocol 9th Ethernet (No. 4) Flow Control and VLAN, Troubleshooting 1. Flow Control of Ethernet> [online] Oct. 2, 2001, Network Technology Lecture, [Searched on Sep. 9, 2002].

As described above, the PAUSE frame defined by IEEE 802.3 causes the switch 1 with which the congestion has been detected to request the inner switches 2-5 and lower terminals thereof to suppress transmission of all the traffic to the switch 1 for a predetermined time. However, such conventional operations have problems discussed below.

(1) Reservation of QoS (Quality of Service)

Because a PAUSE frame does not distinguish the kinds of traffic, e.g., audio and/or video traffic which have strict requirements on delay time and jitter, etc., and data traffic such as FTP (File Transfer Protocol) which has less strict requirements are treated equally. In particular, the QoS for the former traffic cannot be reserved.

(2) Improvement of Effective Throughput

Because transmission of all the traffic to the switch 1 from the switches 2-5 and lower terminals thereof is simultaneously suppressed for a predetermined time, there is a possibility that the PAUSE times lapse concurrently, so that congestion state and non-congestion state repeatedly appear. To improve the throughput, it is preferable that the amount of traffic be constant without fluctuating. The effective throughput cannot be improved by the conventional congestion control.

(3) Equality of Traffic

All the flows are stopped without identifying which flow causes the congestion, it is possible to allocate bandwidth equally to a plurality of existing flows. Namely, transmissions of traffic other than the traffic with which the congestion has occurred are equally suppressed.

SUMMARY OF THE INVENTION

The present invention is, in view of the above problems, aimed to provide a congestion controller in which
when the transmission traffic is controlled in accordance with a PAUSE frame in the event that congestion occurs in an environment in which a plurality of Ethernet switches are connected, the attributes of the traffic are analyzed, whereby the improvement of QoS and the effective throughput, and equality of each traffic can be achieved.

According to the present invention, there is provided a congestion controller for an Ethernet switch comprising
a plurality of transmission queues which have different priorities,
a receiving means for receiving a PAUSE frame,
a suppression means for suppressing transmission traffic from the transmission queues by the received PAUSE frame, wherein
the suppression means suppresses the transmission traffic from a transmission queue of the lowest priority by the PAUSE frame received at a time other than the PAUSE time, and restricts the transmission traffic from the transmission queue of the highest priority, by the PAUSE frame received during the PAUSE time.

According to the present invention, there is provided a congestion controller for an Ethernet switch comprising
a transmission queue,
a receiving means for receiving a PAUSE frame,
a shaping means for shaping the transmission traffic from the transmission queue by the received PAUSE frame, wherein
the shaping means restricts transmission speed of the transmission traffic from the transmission queue to or below a transmission speed based on a predetermined shaping value.

According to the present invention, there provided a congestion controller for an Ethernet switch comprising
a transmission queue,
an identifying means for identifying an input port which causes congestion by counting packets resident in the transmission queue corresponding to the input port,
a transmission means for transmitting a PAUSE frame to other switch which is connected to the identified input port.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 3:
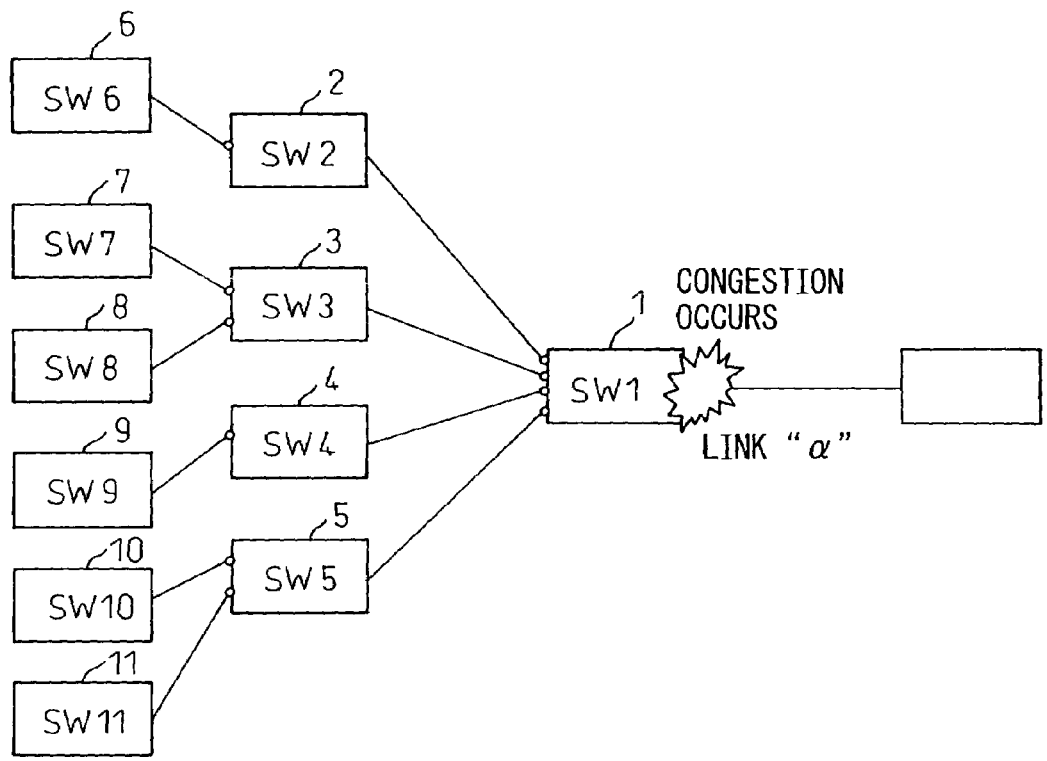
FIG. 3 shows an example of a network construction to which the present invention is applied.

FIG. 3 shows an example of a network construction according to the present invention.

Figure 1:
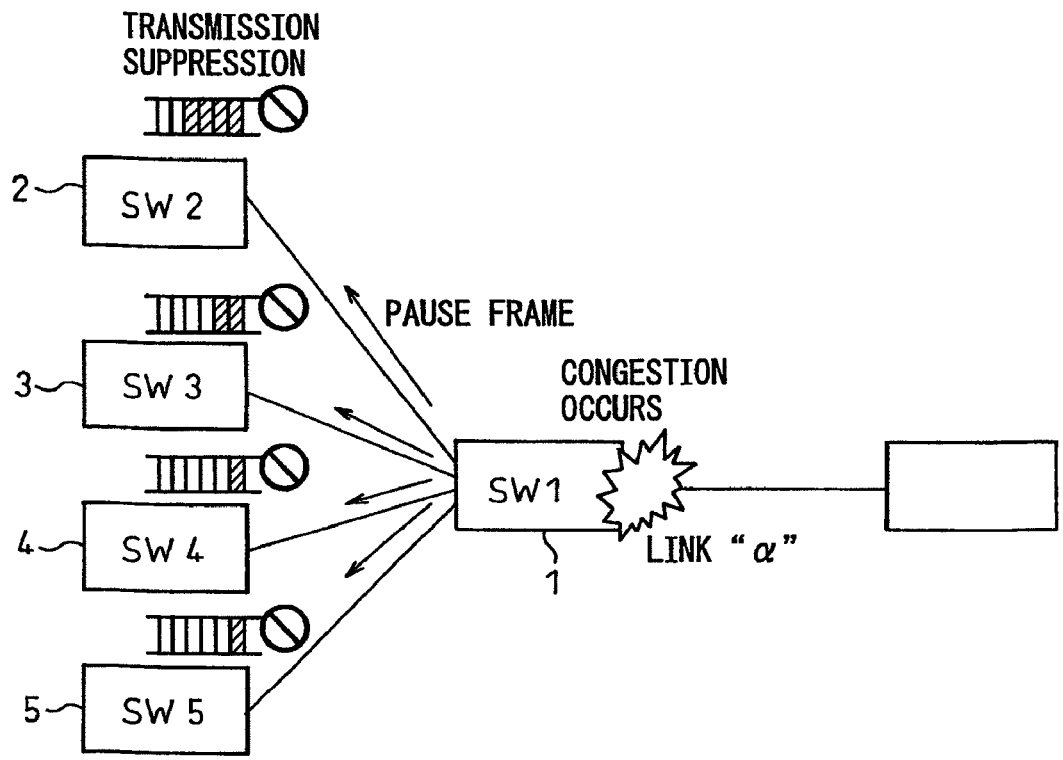
FIG. 1 shows an example of a conventional congestion control by a PAUSE frame.
Figure 2:
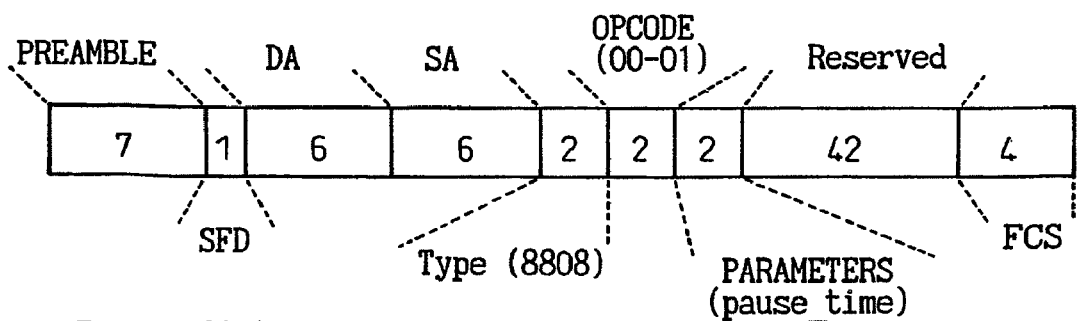
FIG. 2 shows an example of a format of a PAUSE frame.

In this embodiment, the structure is basically the same as that shown in FIG. 1 and described above, each of, for example, switches 2 and 6 which are connected to one of the receiving ports of the switch 1 and each of switches 3, 7, 8 etc., which are connected to other receiving ports configure a transmission unit of a PAUSE frame multicast. In this example, congestion occurs at a link "α" of a sending port of the switch 1.

Figure 4:
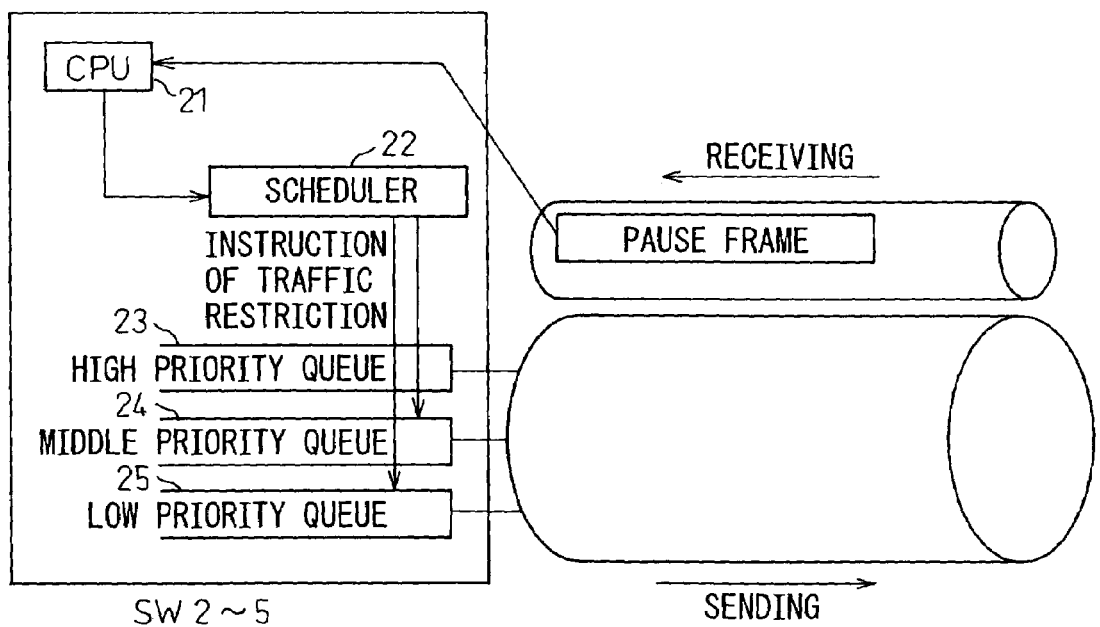
FIG. 4 shows a first embodiment of the present invention.
Figure 5:
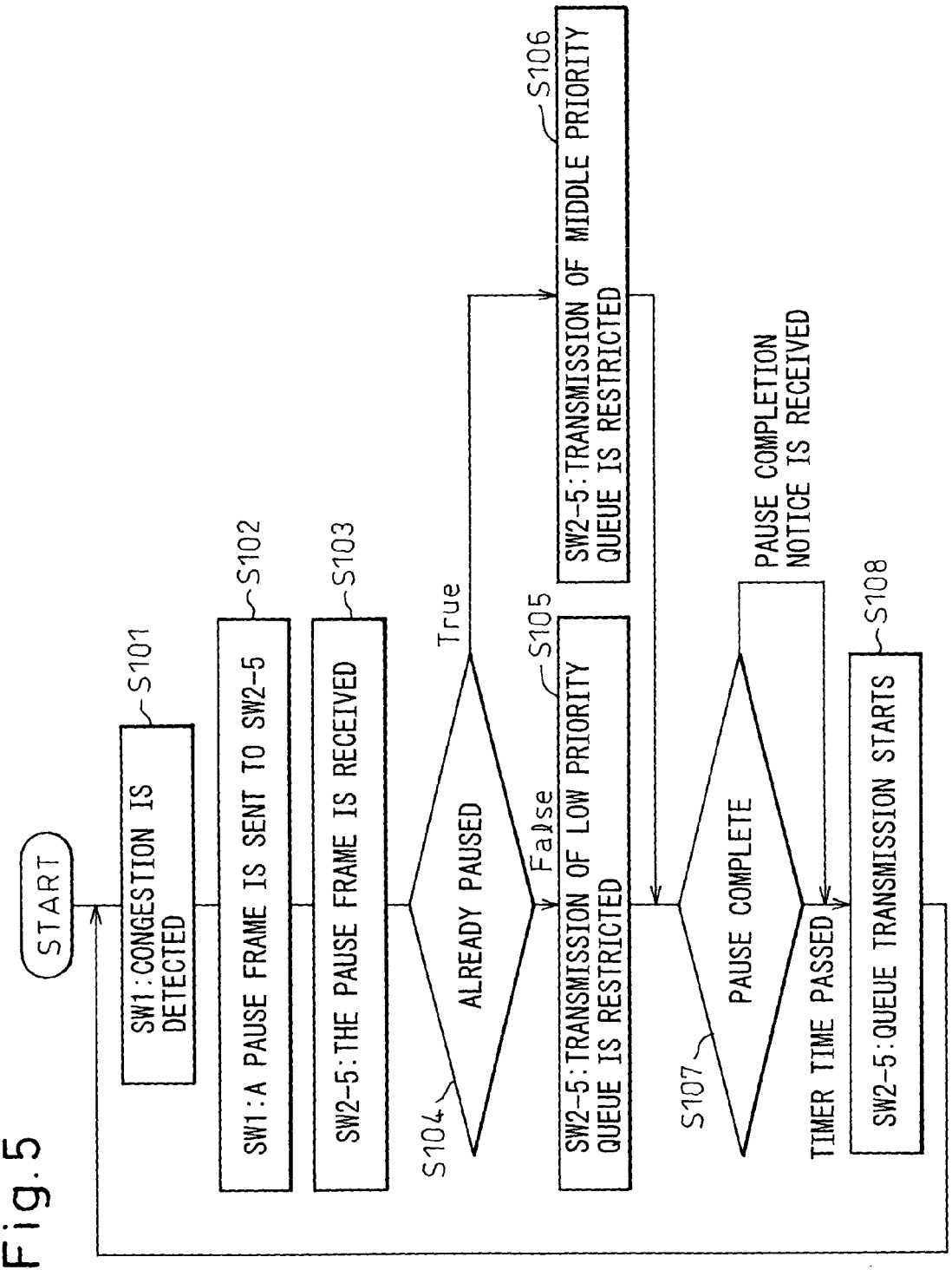
FIG. 5 shows an example of a control flow in FIG. 4.

FIG. 4 shows a first embodiment of the present invention and FIG. 5 shows an example of a control flow shown in FIG. 4.

In this embodiment, a congestion control is performed to reserve QoS. First, the switch 1 of which the congestion is detected based on a threshold value or the like of a buffer sends a PAUSE frame to the inner switches 2-5 (S101 and S102).

The PAUSE frame is detected by a CPU 21 in each of the switches 2-5 (S103), and is transmitted to a scheduler 22. The scheduler 22 controls transmission queues 23-25 having high, middle, or low priority to thereby control the transmission traffic based on the priority. For example, the high priority is assigned to video and/or audio data which requires real-time processing, and the low priority is assigned to data transmission such as FTP.

The scheduler 22 determines the transferred PAUSE frame. If the PAUSE frame is received at a time other than the PAUSE time (normal transmission period), transmission from the low priority queue 25 is controlled (S104 and S105). Another PAUSE frame is received during the PAUSE time, transmission from the middle priority queue 24 is controlled (S104 and S106).

When the timer of the PAUSE time is up, or a PAUSE completion notification (the timer value of the PAUSE frame="0") is received, transmission of the suspended queue begins (S107 and S108). As described above, according to the present invention, the PAUSE operation in consideration of the priority can be carried out. As a result, video and/or audio traffic of the high priority are not be disrupted and the QoS thereof can be reserved, even if the PAUSE frame is received.

Figure 6:
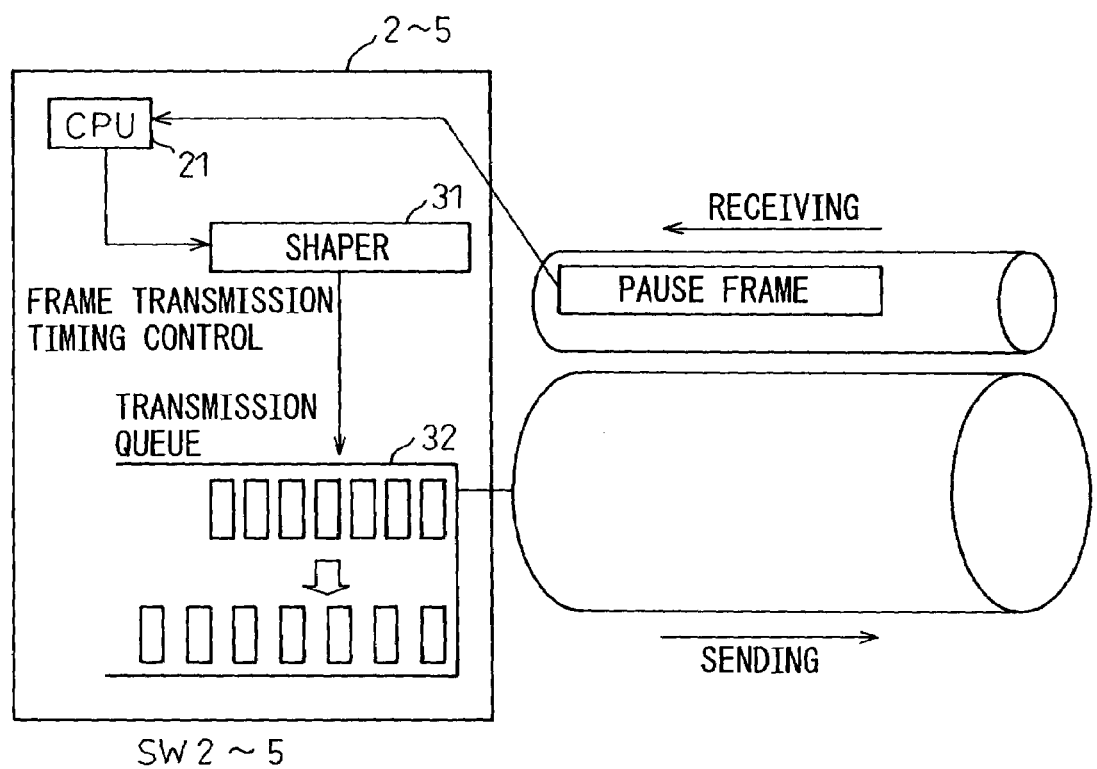
FIG. 6 shows a second embodiment of the present invention.
Figure 7:
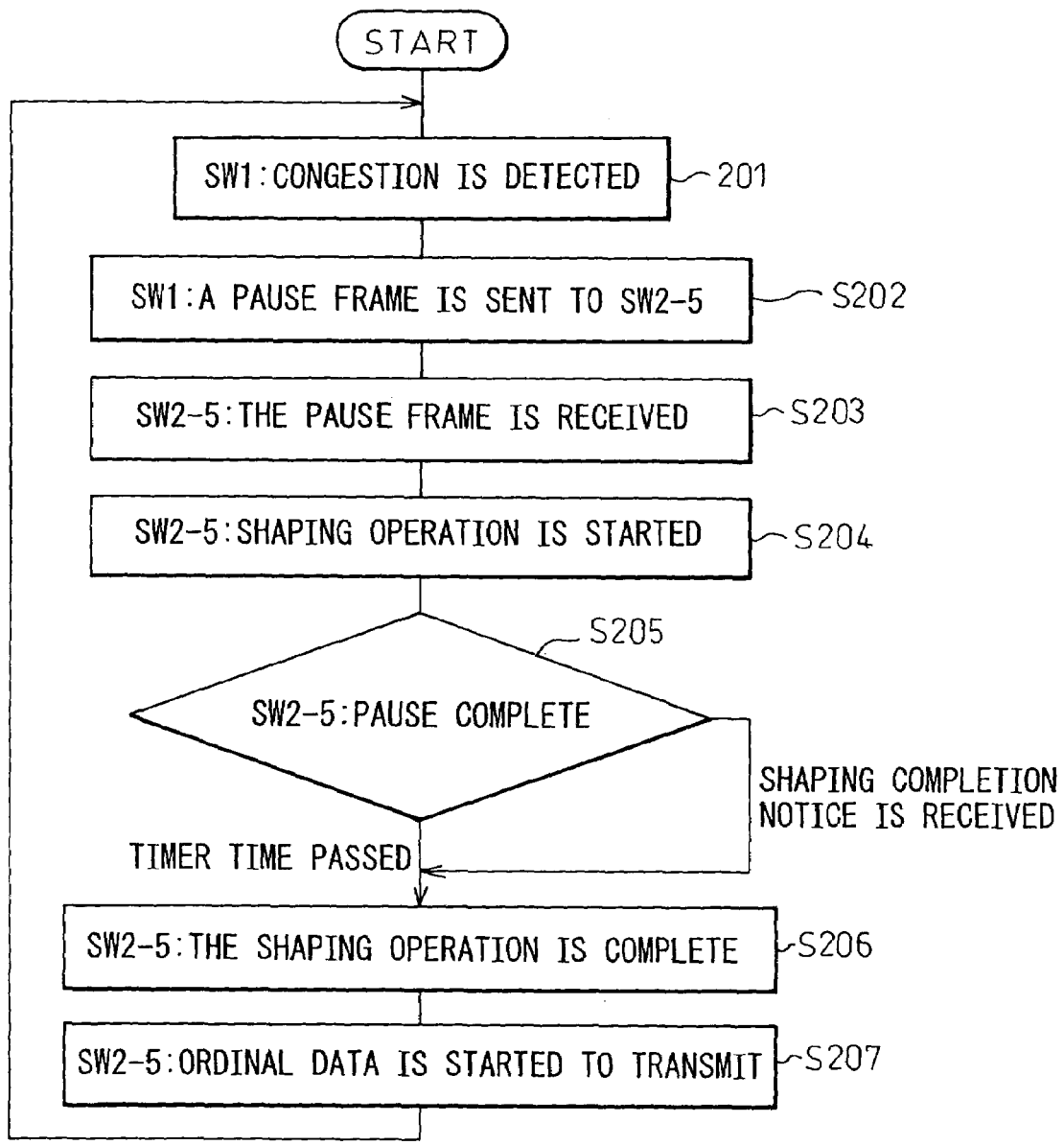
FIG. 7 shows an example of a control flow in FIG. 6.

FIG. 6 shows a second embodiment of the present invention, and FIG. 7 shows an example of a control flow of FIG. 6.

In this embodiment, a congestion control in which the effective throughput is improved by shaping is performed. First, the switch 1 of which congestion has been based on by a threshold value or the like of a buffer sends a PAUSE frame to inner switches 2-5 (S201 and S202).

The PAUSE frame is detected by the CPU 21 in each of the switches 2-5 (S203), and is transferred to a shaper 31. The shaper 31 starts the shaping operation to restrict the transmission speed of transmission queue 32 to 50% of the original physical speed (S204).

Figure 8:
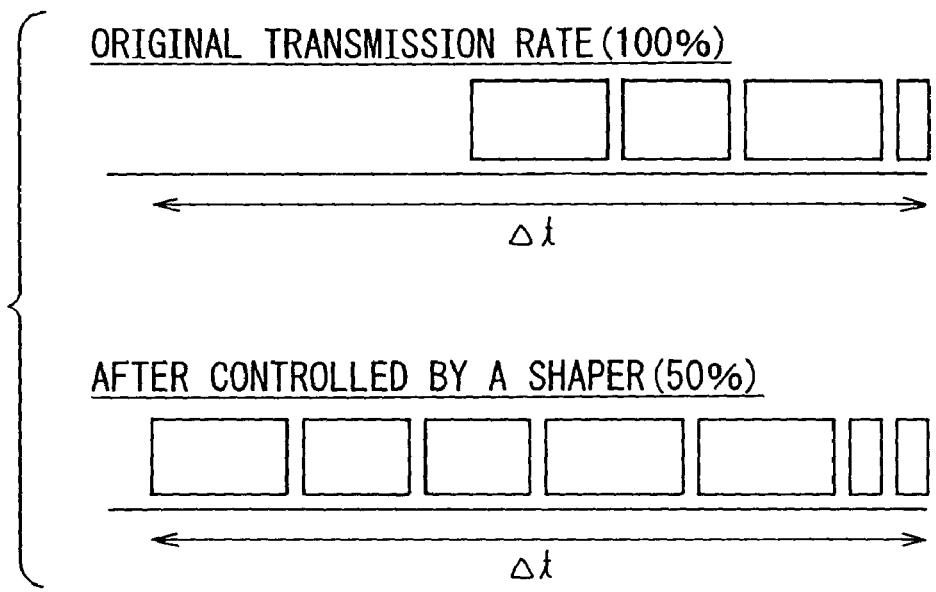
FIG. 8 shows an example (1) of a shaping operation in FIG. 6.
Figure 9:
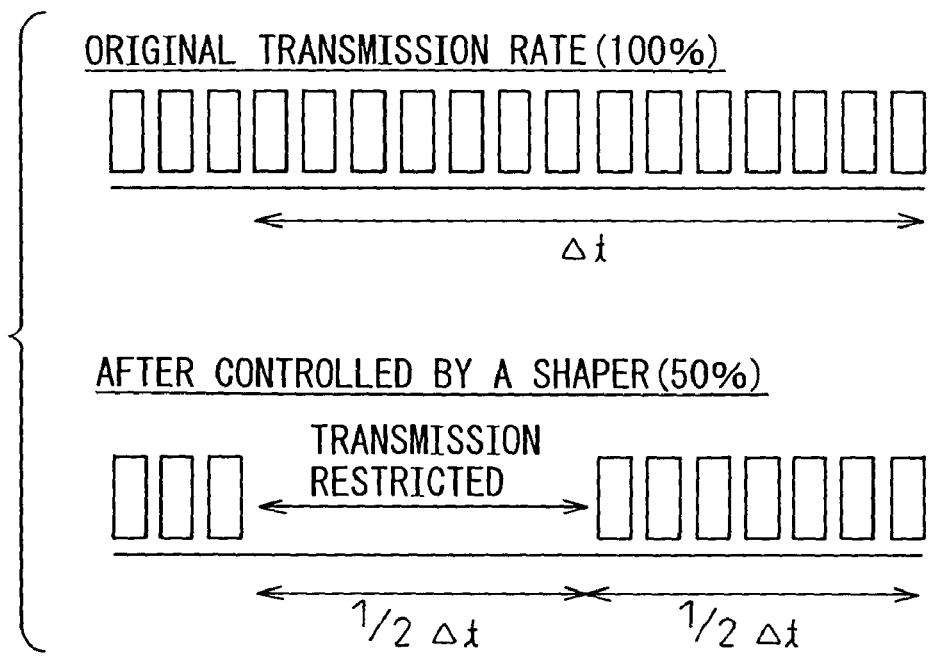
FIG. 9 shows an example (2) of a shaping operation in FIG. 6.

FIG. 8 and FIG. 9 show examples of the shaping operation shown in FIG. 6.

In an example of FIG. 8, a gap is calculated based on the frame length. Namely, a gap based on the frame length of each transmission frame and the shaping rate value (50%) is calculated and obtained by the following formula:

Gap value[sec]=frame length[sec]×(100-shaping rate [%])÷100

As a result, a gap of an identical frame length is added to each transmission frame from the transmission queue 32, and thus, the shaping operation in which, for example, the transmission speed is limited to 50% of the physical speed is performed. In an example of FIG. 9, the time At for which the frame transmission normally lasts is reduced to Δt/2, so that the shaping is achieved by 50%.

After that, when the timer of the PAUSE time expires or the PAUSE completion notification (the timer value of the PAUSE frame="0") is received, the shaping operation ends and normal data transmission is resumed (S205 and S206). In this example, the shaping values (%) of the inner switches 2-5 are pre-determined to prevent congestion at the switch 1.

Namely, the shaping value (%) of each inner switch 2-5 is determined so that a sum of the effective transmission speeds of the inner switches 2-5 does not exceed the effective transmission speed of the switch 1. As described above, in this example, the switches 2-5 can continue the transmission even if the PAUSE frame is received, and accordingly, a congestion control in which the resultant effective throughput of the whole network is achieved can be achieved.

Alternatively, this example can be combined with the first embodiment, wherein for example, the shaping operation is not performed for the high priority queue 23, or the shaping degree is increased to 80% instead of suppression of the transmission of the low priority queue 25 to thereby reserve the QoS and enhance the effective throughput improvement.

Figure 10:
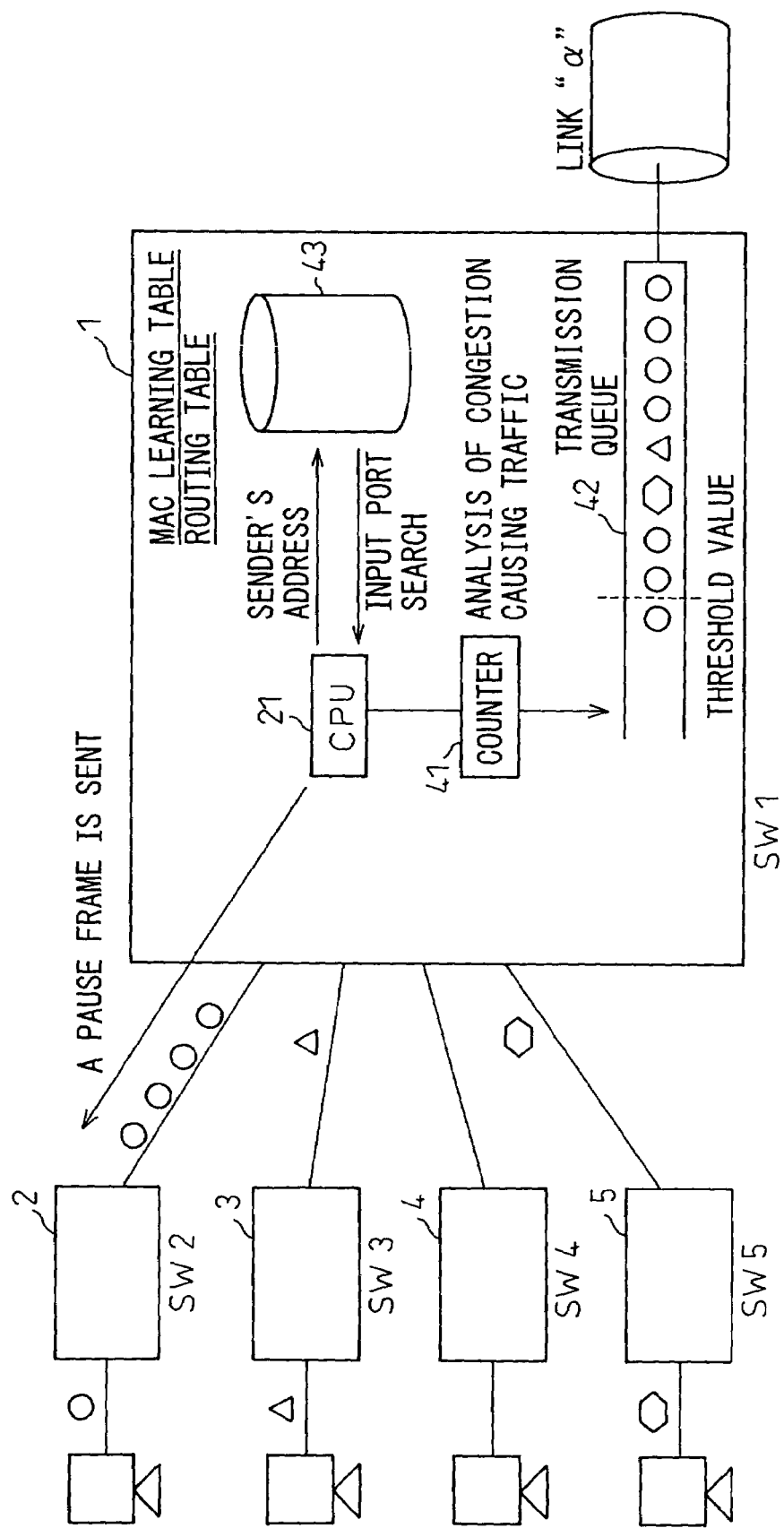
FIG. 10 shows a third embodiment of the present invention.
Figure 11:
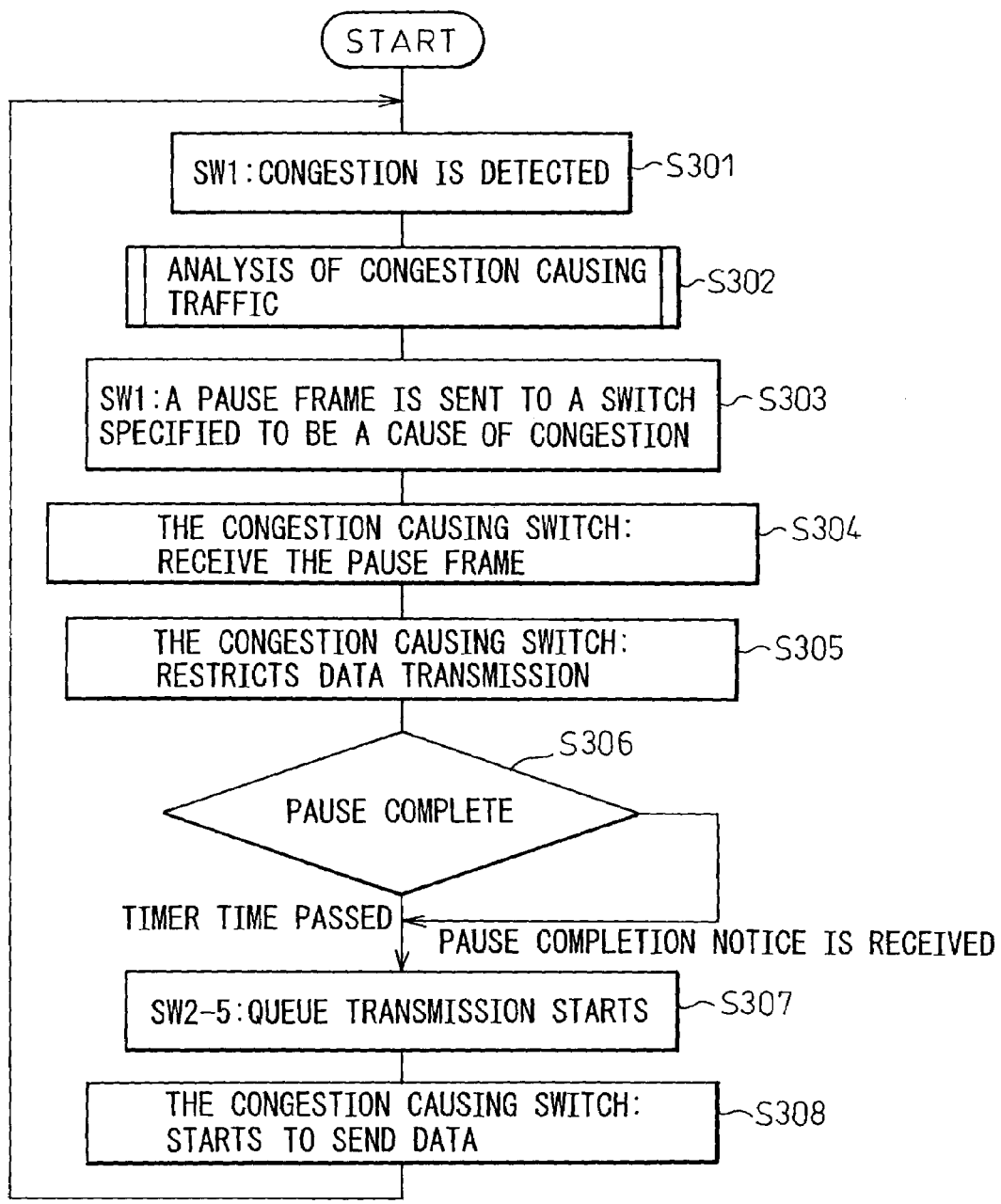
FIG. 11 shows an example (1) of a control flow in FIG. 10.
Figure 12:
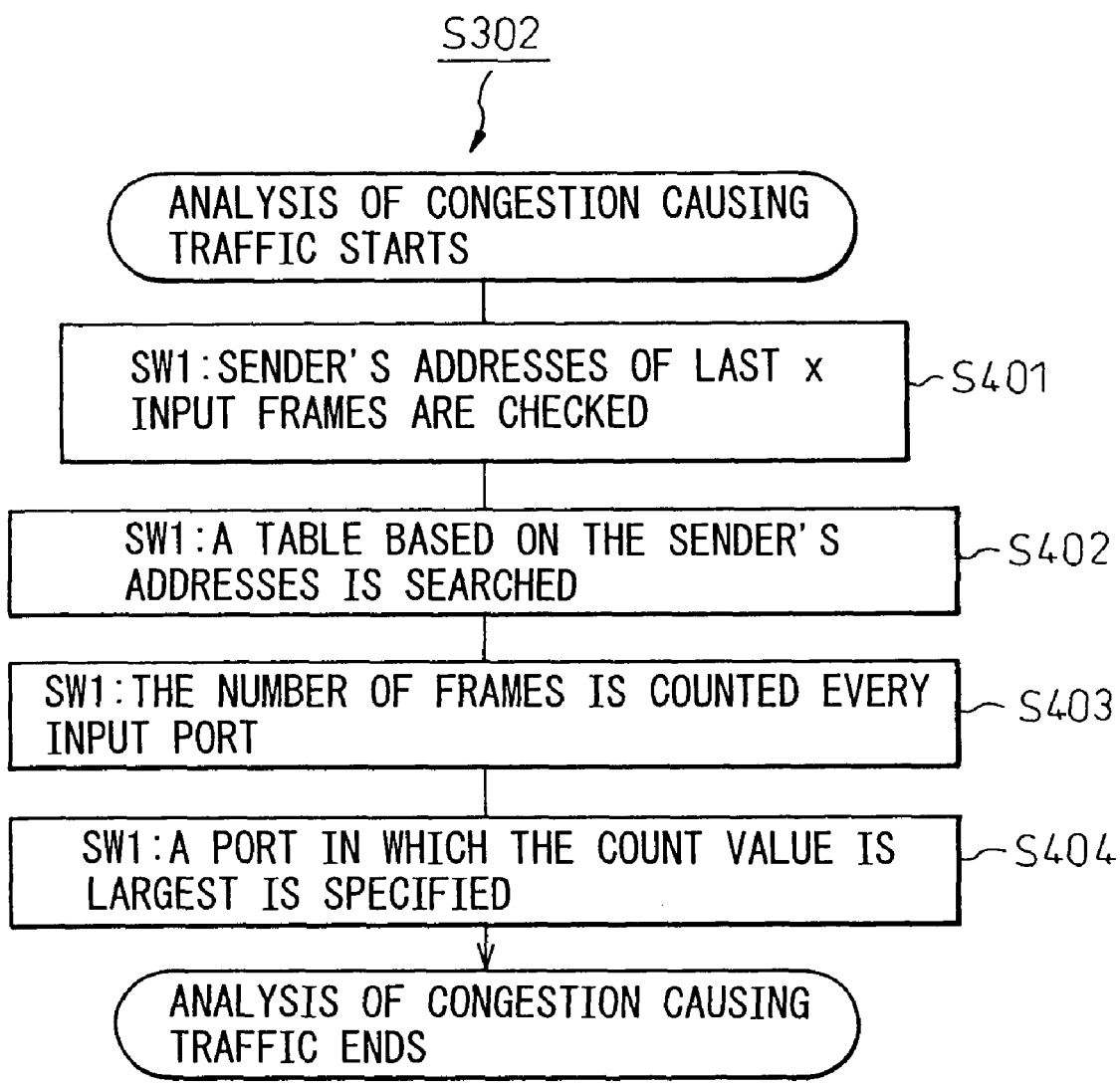
FIG. 12 shows an example (2) of a control flow in FIG. 10.

FIG. 10 shows a third embodiment of the present invention. FIG. 11 and FIG. 12 show an example of a control flow of FIG. 10.

In this embodiment, a congestion control is performed to achieve equality of the traffic by allocating the bandwidth equally to a plurality of the existing flows. In contrast to the first and second embodiments applied to the inner switches 2-5, this embodiment is applied to the switch 1.

In FIG. 10, the switch 1 detects the congestion when the transmission queue 42 of the sending port to the link "α" exceeds a predetermined threshold value (S302). Thereafter, in this embodiment, attribute of the packet (e.g., sending address or port number of TCP/UDP) resident in the transmission queue 42 is analyzed (S302). The detailed flow of this congestion factor traffic analysis routine is shown in FIG. 12.

In FIG. 12, first, the senders' addresses of the X packets (for example, X=100) in the late input frame are checked, and corresponding input ports are retrieved with reference to a table 43 (FIG. 10) comprised of a learning table or a routing table of the MAC address, based on the sender's addresses (S401 and S402). Next, the number of the received packets is counted for each searched input port, by a counter 41 (FIG. 10). Thus, the input port in which the count value is largest can be specified (S403 and S404).

Figure 13:
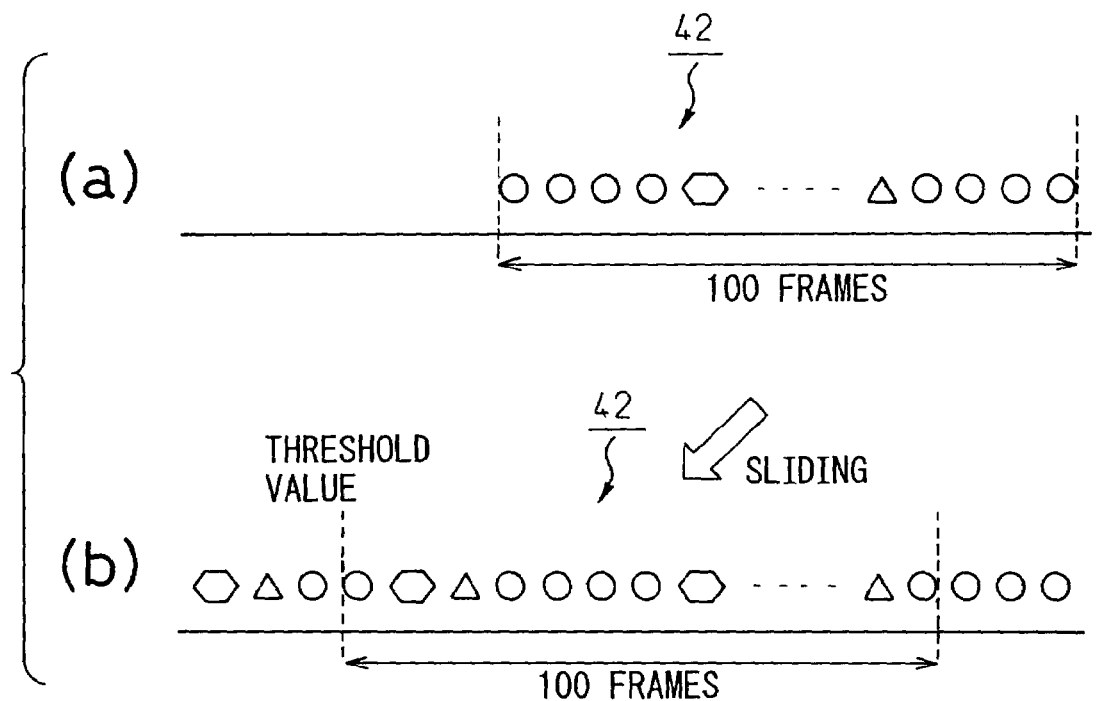
FIG. 13 schematically shows an example of a traffic analyzing process.

FIG. 13 schematically shows an example of the above analyzing process.

(a) in the drawing shows an operation when the number of the frames (packets) resident in the transmission queue 42 is below the threshold value. When the number of the frames reaches the threshold value as shown in (b) in the drawing, in this example, the senders' addresses of the preceding 100 frames including the frame by which the number of the frames becomes the threshold value are checked, and the corresponding input ports are retrieved with reference to the table 43.

It is obvious from FIG. 10 that marks ○, □, etc., represent frames from different input ports. Accordingly, the respective numbers of the frames ○, frames □, etc., are counted by the respective counters 41. For example, if the number of the frames ○: frames □: frames . . . , are l, m and n, respectively (wherein l>m, n, it is judged that the input port of the frames ○ is the cause of congestion, and is subject to the congestion control (S403 and S404).

In the above example, an input port of the largest number of frames is determined to be cause of congestion, but it is also possible to judge that an input port of the specific frames corresponding to those not less than 50% of the total resident frames is the cause of the congestion. Alternatively, a predetermined number of frames is continuously monitored, so that the flow which causes the congestion can be determined from the information of the resident frames at the time when the congestion is detected.

Referring to FIGS. 10 and 11, the switch 1 sends a PAUSE frame only to an input port of the traffic (frame ○) which has been identified as the cause of congestion (S303). In the example of FIG. 10, the PAUSE frame is sent to the switch 2 connected to the above input port. Accordingly, only the switch 2 which has received the PAUSE frame starts the PAUSE process and the control ends (S304-S308).

Moreover, the attributes of the packet (e.g., sending address, port number of TCP/UDP, etc.) whose traffic has been specified as the cause of congestion are preset in the PAUSE frame, so that the switch 2 which receives the PAUSE frame can suppress transmission of only that traffic. In this alternative, the switch 2 must be provided with function to discriminate the specific attribute and dynamically restrict the corresponding traffic.

As described above, in this example, as only a switch specified as the cause of congestion becomes an object for the PAUSE process, it is possible to prevent only the switch from occupying network resource, resulting in equal allocation of the bandwidth to other existing switches.

This embodiment is applied to the switch 1 which detects the congestion and can be combined with the first and the second embodiments applied to the inner switches 2-5 to carry out a congestion control in which the QoS is reserved, the effective throughput is enhanced, and equality of the traffic is ensured.

As described above, according to the present invention, a congestion control considering the QoS can be performed. Moreover, according to the present invention, no repetitive appearance of the congestion state and non-congestion state occurs, and the effective throughput in the network in which the congestion has occurred can be improved. Furthermore, according to the present invention, only a specified transmission traffic which causes the congestion is restricted, whereby equal utilization of the network resource can be ensured.

The invention claimed is:

1. A congestion controller for an Ethernet switch at a reception side of a PAUSE frame, comprising
    a plurality of transmission queues which have different priorities,
    receiving means for receiving the PAUSE frame including a parameter field in which a timer value of PAUSE time is set,
    restriction means for restricting transmission traffic from the transmission queues by the received PAUSE frame, wherein
    the restriction means restricts (i) the transmission traffic from a first transmission queue of a lowest priority by the PAUSE frame received at a time other than the PAUSE time, and restricts (ii) the transmission traffic from the first transmission queue of the lowest priority and from, in addition to this, a second transmission queue having a higher priority than the first transmission queue of the lowest priority, by the PAUSE frame received during the PAUSE time.

2. The congestion controller according to claim 1, further comprising
    a shaping means for shaping the transmission traffic from the transmission queues by the received PAUSE frame, wherein
    the shaping means restricts the transmission traffic from the first transmission queue of the lowest priority by increasing the shaping degree.

3. The congestion controller according to claim 2 in which the restriction of the transmission traffic is performed by providing a gap therein.

4. The congestion controller according to claim 1 for the Ethernet switch, as a first Ethernet switch, further cooperating with a second congestion controller for a second Ethernet switch, facing to the first Ethernet switch, at a transmission side of the second Ethernet switch, transmitting said PAUSE frame to the first Ethernet switch, the second congestion controller comprising
    a transmission queue connected with a sending port to a link,
    an identifying means for identifying an input port which causes congestion by counting packets resident in the transmission queue, corresponding to the input port, and
    a transmission means for transmitting the PAUSE frame to said reception side of said first Ethernet switch, which transmission means are connected to the identified input port.

5. The congestion controller according to claim 4, wherein the identifying means further identifies a traffic based on attributes of the packets, and the transmission means notifies the reception side of the identified traffic by the PAUSE frame transmitted thereto.

* * * * *